(12) United States Patent
Wintersgill et al.

(10) Patent No.: US 6,908,087 B2
(45) Date of Patent: Jun. 21, 2005

(54) MOBILE LOAD CARRIER WITH CASTOR MOUNTING ARRANGEMENT

(75) Inventors: Stephen Wintersgill, Rochdale (GB); John Robinson, Rochdale (GB)

(73) Assignee: Dynamic Products Limited, Lancashire (GB)

( * ) Notice: Subject to any disclaimer, the term of this patent is extended or adjusted under 35 U.S.C. 154(b) by 0 days.

(21) Appl. No.: 10/478,024

(22) PCT Filed: May 15, 2002

(86) PCT No.: PCT/GB02/02315
§ 371 (c)(1),
(2), (4) Date: Mar. 22, 2004

(87) PCT Pub. No.: WO02/092408
PCT Pub. Date: Nov. 21, 2002

(65) Prior Publication Data
US 2004/0145135 A1 Jul. 29, 2004

(30) Foreign Application Priority Data
May 16, 2001 (GB) .............................. 0111929
Jun. 23, 2001 (GB) .............................. 0115423

(51) Int. Cl.$^7$ .............................................. B62D 39/00
(52) U.S. Cl. ..................... 280/33.991; 280/645; 280/37; 16/35 R
(58) Field of Search ............................ 280/84, 85, 86, 280/86.1, 86.751, 33.991, 33.992, 47.38, 37, 641, 642, 645; 16/35 R, 18 R, 45, 34, 30, 32

(56) References Cited

U.S. PATENT DOCUMENTS

| 2,583,858 A | | 1/1952 | Kostolecki | |
|---|---|---|---|---|
| 2,707,877 A | * | 5/1955 | Cline ............................ | 16/34 |
| 2,814,498 A | * | 11/1957 | Hull .............................. | 16/34 |
| 3,636,586 A | | 1/1972 | Bollinger | |
| 3,751,758 A | | 8/1973 | Higbee | |
| 4,000,912 A | | 1/1977 | Donald | |
| 4,037,291 A | | 7/1977 | Huempfner | |
| 4,336,629 A | | 6/1982 | Jarvis, Jr. | |
| 4,485,521 A | * | 12/1984 | Welsch et al. ................. | 16/44 |
| 4,494,272 A | | 1/1985 | Morita | |
| 4,559,669 A | * | 12/1985 | Bonzer et al. ................. | 16/44 |
| 4,681,192 A | | 7/1987 | James | |
| 4,684,148 A | | 8/1987 | Glaser | |
| 4,799,879 A | | 1/1989 | Laspeyres | |
| 4,805,259 A | | 2/1989 | Kassai | |

(Continued)

FOREIGN PATENT DOCUMENTS

| DE | 1229855 | 12/1966 |
|---|---|---|
| DE | 3612925 | 10/1987 |
| DE | 9211745 U | 12/1992 |
| EP | 0064269 | 11/1982 |

(Continued)

Primary Examiner—Hau Phan
(74) Attorney, Agent, or Firm—Woodard, Emhardt, Moriarty, McNett & Henry LLP (57) ABSTRACT

A mobile load carrier comprises a castor mounting arrangement comprising two or swivellable castors mounted on a first member (7), characterized in that said first member (7) is rotatably attached to a second member or member (5), along a fixed, substantially horizontal axis (6) substantially perpendicular to the primary direction of travel of the mobile load carrier, said second member(s) (7) being attached to, or forming part of, the structure of the mobile load carrier, such that any movement of the castors' swivel axes, relative to the chassis, is synchronous, with movement only being possible via the rotatable attachment of the first member (7) to the second member(s) (5). Preferably the rotation is load dependent with the load dependency optionally being provided by one or more biasing members (10).

13 Claims, 6 Drawing Sheets

U.S. PATENT DOCUMENTS

| | | | |
|---|---|---|---|
| 4,875,696 A | | 10/1989 | Welch |
| 5,253,389 A | * | 10/1993 | Colin .......................... 16/30 |
| 5,365,635 A | * | 11/1994 | Jang ............................ 16/34 |
| 5,517,718 A | | 5/1996 | Eichhorn |
| 5,799,366 A | | 9/1998 | Zocco |
| 5,899,469 A | | 5/1999 | Pinto |
| 6,149,169 A | * | 11/2000 | Chelgren .................. 280/86.1 |
| 6,478,315 B1 | * | 11/2002 | Manesis ...................... 16/34 |
| 6,776,428 B2 | * | 8/2004 | Strong ...................... 16/18 R |

FOREIGN PATENT DOCUMENTS

| | | |
|---|---|---|
| EP | 0820881 | 1/1998 |
| EP | 1142548 | 10/2001 |
| FR | 2703016 | 9/1994 |
| GB | 0880487 | 3/1960 |
| GB | 2274979 | 8/1994 |
| GB | 2278773 | 12/1994 |
| GB | 2333698 | 8/1999 |
| WO | 94/08801 | 4/1994 |
| WO | 98/35841 | 8/1998 |

* cited by examiner

MOBILE LOAD CARRIER WITH CASTOR MOUNTING ARRANGEMENT

The present invention relates to a castor mounting arrangement for a mobile load carrier and more particularly to a castor mounting bracket suitable for use on carts and trolleys of the type provided in retail outlets such as supermarkets and DIY superstores and luggage trolleys such as those found at airports and railway stations.

Figure 1:
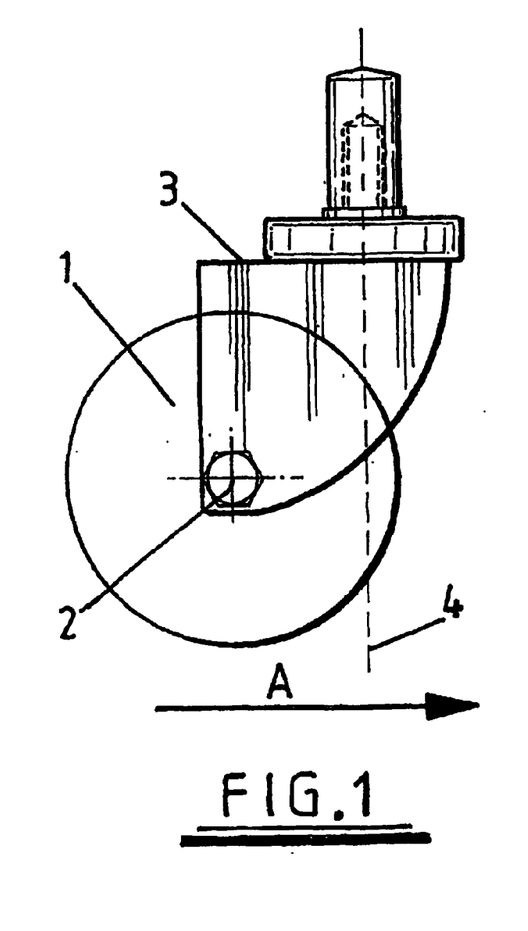
FIG. 1: Shows a prior art standard castor arrangement, as is commonly found on mobile load bearers.

Taking initially, the non-limiting example of a supermarket shopping trolley, such a load carrying vehicle is usually provided with four identical swivel castors. Referring to FIG. 1, a traditional castor comprises a wheel 1 in which the wheel's axle 2 (which defines its axis of rotation) is mounted to a wheel mount 3, which is free to swivel about a substantially vertical axis 4, the wheel's axle 2 being offset horizontally from the wheel mount's swivel axis 4. This geometry provides a stable arrangement in which the wheel's axle 2 will tend to trail the swivel axis 4 when a horizontal motive force is applied to the mount 3, the axle 2 tending to align perpendicularly to the direction of motion A.

The use of four such freely swivellable castors should provide excellent manoeuvrability for a shopping trolley, however, for the optimal manoeuvrability to be exhibited, the trolley would have to be perfectly balanced and the four castors would have to be made to far more exacting standards than is currently practicable. Even if such a trolley were arranged with four truly identical castors, it would not be long before uneven wear of the castor tyres and the ingress of dirt and grit, from car parks and the like, into the bearings resulted in the same inequality of castor as is currently found.

Whilst a trolley is unladen, it is relatively easy to steer, since it is relatively light and the force required to pivot the trolley about it's centre of gravity is relatively low, however, as the load in the trolley increases, the forces required to effect changes of direction increase also, and two main problems become clearly apparent.

Firstly, when pushing a trolley across an incline, as is commonly found in supermarket car parks and loading areas, gravity acts on the load and in conjunction with the gradient produces a resultant side force which tends to push the trolley front down the gradient, rather than allowing it to traverse across. As the trolley front is the more difficult to control due to the distant centre of mass, front end drift occurs with the castors aligning themselves down the incline as the trolley front runs away from the user. The only corrective action possible is for the person pushing the trolley to attempt to push the rear of the trolley further down the slope than the trolley front in order to move around and underneath the centre of mass and push up as well as across the incline in order to keep the trolley moving in a straight line. This is often very difficult to do, as pushing the rear of the trolley down the slope merely accelerates the downward tendency of the trolley front resulting in an irreversible downward drift.

Secondly, as load is increased it becomes increasingly difficult to corner efficiently in supermarkets or on level surfaces, since if all four castors are ostensibly free to swivel, then there is no fulcrum for the trolley to steer about. This means that to turn a 180 degree corner, as found at the end of most supermarket aisles, the user has to walk around the mass of the trolley, pushing the rear of the trolley outwards, then realigning the trolley to the new direction of travel. This often involves cornering along a wider arc than is necessary, since the momentum of the trolley tends to continue to push the trolley front onwards and away from the desired course, with the front castors duly following the onward tendency of the trolley creating an understeering effect.

There have been many attempts in recent (and indeed not so recent) years to overcome these problems with steering, however, none have been entirely successful or satisfactory. Still, it is worth discussing the prior attempts as they provide a useful starting point for an understanding of the present invention.

The prior art attempts to alleviate the steering problems of shopping trolleys and like vehicles or carts fall into two broad categories, firstly there are those who have suggested locking one or both sets of wheels, temporarily in a forward direction, thereby making it easier to steer. Such efforts fall into two main groups, castors/wheels with manually operated locking mechanisms, such as U.S. Pat. No. 5,899,469 (PINTO), U.S. Pat. No. 5,799,366 (ZOCCO), U.S. Pat. No. 4,875,696 (WELCH), U.S. Pat. No. 4,805,259 (KASSAI), U.S. Pat. No. 4,799,879 (KASSAI), U.S. Pat. No. 4,684,148 (GLASER), U.S. Pat. No. 4,681,192 (JAMES), U.S. Pat. No. 4,336,629 (JARVIS JR), U.S. Pat. No. 4,037,291 (HUEMPFNER), U.S. Pat. No. 3,751,758 (HIGBEE) and U.S. Pat. No. 3,636,586 (BOLLINGER). Some of these mechanisms are arranged such that a pair of wheels are locked simultaneously whereas some allow independent locking of each wheel, however, all are activated by a user deliberately pressing a button, moving a lever of using a switch etc., this presents a number of problems, namely the expense of the units, potential for mechanical failure, lack of retrofittability and the necessity to teach individual users how to operate the device, which is, as mentioned, impractical in a supermarket environment. Furthermore, if either pair of castors are locked, it becomes hazardous to move the trolley sideways, as is sometimes necessary in a busy supermarket, since with the castors locked, there exists a risk that the trolley will simply tip over instead of moving in the requisite lateral manner.

Other locking mechanisms, which do not require manual input to apply their swivel locks, have also been suggested, notably in U.S. Pat. No. 5,517,718 (EICHHORN), U.S. Pat. No. 4,494,272 (MORITA) and U.S. Pat. No. 2,583,858 (KOSTOLECKI). However, all require the addition of a number of extra parts and suffer in one way or another from a lack of retrofittability, high cost base, high maintenance requirements or they simply do not perform to standard in terms of stability, particularly with respect to the requirement for lateral movement without increased risk of toppling.

Finally, all of the "locking" mechanisms present a difficulty when a nested line of trolleys must be manoeuvred around a car park to a collection point. Since such a line of nested trolleys will have locked castors distributed all the way along its length it will be almost impossible to steer.

More recent ideas have been focussed towards improving the tracking of the castors, i.e. their propensity to stay correctly aligned during forward motion of the trolley, by tilting their swivel axis forwards and away from the vertical, such that the trolley is raised up from its lowest potential energy position whenever the castors are not aligned to trail the trolley in a forwards direction, thereby utilising gravity and the mass of the trolley to keep the castors in the desired alignment. This idea is utilised to varying degrees in GB 2,333,698 (CLARES MERCHANDISING), GB 2,274,979 (CARSON), WO 98/35841 (R&D MARINE LTD), EP 0,064,269 (PEMCO), GB 880,487 (AUTOSET), U.S. Pat. No. 4,000,912 (DONALD) and GB 2,278,773 (CLARES EQUIPMENT), which are discussed in more detail below.

GB 2,278,773 (CLARES EQUIPMENT) describes a fixed arrangement, wherein one or more of the castors has its swivel axis fixedly offset from the vertical. This arrangement does make the trolley easier to steer when travelling in a forwards direction, however, if the trolley is moved in a reverse or lateral direction the castors have a propensity to stray from a trailing alignment, since their preferred position is still rearwards of their mounts with respect to the forward direction of movement, this in turn leads to unusual handing effects and unwanted independent trolley movement. Furthermore, the full swivel correction is present even when the trolley is empty, thus a nested line of trolleys may become difficult to manoeuvre.

WO 98/35841 (R&D MARINE) overcomes one of these problems by providing a hinged attachment for the castors, such that when travelling in a forwards direction the swivel axis is inclined, but when the direction of travel is reversed, the swivel axis is restored to the vertical, thus removing all steering propensity. The solution has however an inherent instability in that the castors can be found in opposing directions and in these circumstances one or more fail to contribute in carrying the trolley load, leading to inherent instability. The problem of the device being insensitive to load is also an issue in that the castor axis tilting movement can be rapid, inducing instability, especially where a high centre of mass is concerned. In addition, when manoeuvring a line of nested trolleys the swivel axis is always fully deflected whenever the trolley is moving in a forwards direction repeating the shortcomings of the previous (CLARES) solution.

GB 2,274,979 (CARSON), the exact mode of operation of the castor arrangement in is not clearly described, however, it is clear that the swivel axes of the front wheels are independent, which may lead to stability issues as discussed previously, and can under certain conditions lock in line, inducing tipping problems when lateral movement is attempted.

EP 0,064,269 (PEMCO), GB 880,487 (AUTOSET), and U.S. Pat. No. 4,000,912 (DONALD), all describe tilting sprung mechanisms, wherein the castors' swivel axis is deflected away from the vertical in whichever direction the trolley is moving. Whilst this arguably represents an improvement over a standard arrangement, the trolley has a preference for continued motion in whichever direction it is being propelled. This means that whilst it is easier to keep the trolley moving in a straight line, especially when fully laden, cornering is arguably even more difficult than was previously the case. It is worth noting that the primary intention of these arrangements was not in fact to improve the steering of the trolley, but to introduce shock absorbing mechanisms to either improve ride quality or prolong castor and bearing life.

GB 2,333,698 (CLARES MERCHANDISING) provides the most satisfactory of the prior art solutions. However, the torsionally rigid coupling between the castors is attached below the resilient mountings, and as such does not eliminate all unwanted or unnecessary freedoms of movement. This can be disadvantageous in that the trolley body can move independently of the castors, and therefore the ground, leading to reduced steering efficiency and potentially reduced toppling angles. The offset arrangement of the castor axis to the resilient mountings is such that when the castors are at the 90° position, as when the trolley is pulled sideways, the castors when under load are tilted sideways and retain a propensity to swivel back to the trailing position, this in turn promotes unusual handling effects for the shopper and allows the trolley to move without shopper input. These problems are largely caused by the fact that the resilient mountings are being asked to perform two jobs, firstly they are acting as biasing members, providing the load dependency and secondly, they are also acting as the pivot about which the castor mounts rotate, it is this second function which causes difficulties, since the pivot point is variably dependent on the relative degree of compression of the resilient mountings. The rubber bushes are also exposed which leaves them prone to collision damage and also adverse environmental conditions, such as salt, grit, and U.V. degradation.

Figure 2:
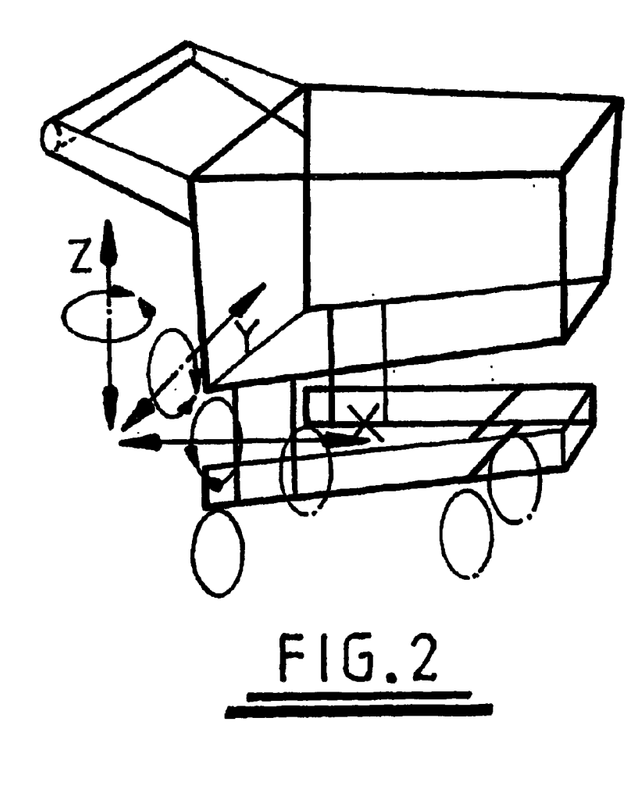
FIG. 2: Shows a schematic of a shopping trolley, with the X, Y and Z axes overlaid.

As can be seen from the above examples, all attempt to control or restrict one, more or all of the six freedoms of motion of at least one of the castors/castor mounts, namely rotation about and/or translation along the three axes of a three dimensional Cartesian co-ordinate system, wherein the longitudinal axis aligned to the forward direction of the trolley is designated X, the transverse axis acting at right angles to the longitudinal axis but on the same horizontal plane is designated Y, and the vertical axis acting at right angles to both the X and Y axes is designated Z, see FIG. 2. However, as is also clear, none of them succeed in sufficiently restricting these freedoms of movement to provide a satisfactorily manoeuvrable trolley.

It is an object of the present invention to obviate or mitigate the aforesaid problems.

The term "forward direction" is used to refer to the primary direction of motion of the mobile load bearer, similarly the term "reverse direction" is used to refer to the opposite direction and "sideways" is used to refer to a direction of motion substantially 90 degrees away from both the forward and reverse directions.

The term "standard trailing position" is used to refer to the orientation of a castor when the mobile load bearer is being propelled in a forward direction.

According to a first aspect of the present invention there is provided a mobile load carrier comprising a load carrying portion and a castor mounting arrangement, the arrangement comprising a first member on which two or more castors are rotationally mounted, each castor being rotatable about a substantially upright swivel axis, and a second member attached to, or forming part of, the load carrying portion, the second member being rotationally connected to the first member, characterised in that rotation of the first member relative to the second member is only permitted about a substantially horizontal axis of rotation which is transverse to a primary direction of travel of the mobile load carrier, the rotation effecting synchronous tilting of the swivel axes of the castors preferably the rotation is load dependent, with the load dependency optionally being provided by one or more biasing members.

Preferably the one or more biasing members comprise one or more elastomeric elements disposed between said first and said second members.

Alternatively, the one or more biasing members may comprise one or more spring elements such as, for example, coil springs, leaf springs, torsion springs, pneumatic springs, hydroelastic springs, or any other such biasing means used in either compression or in tension.

Preferably the castor swivel axes intersect the horizontal rotation axis, hereby rotation is only permitted when each of the two or more castors are within 90 degrees of their standard trailing position, the relationship between the permitted rotation about the horizontal rotation axis and the positional relationship of said horizontal axis and the castor swivel axes being described in more detail on page 11 herein.

Alternatively, the castor swivel axes may be forward of the horizontal rotation axis, whereby rotation is only permitted when each of the two or more castors are within less than 90 degrees of their standard trailing position.

Optionally, the first and second members respectively form the lower and upper leaves of a hinge, the hinge pin of which forms the substantially horizontal rotation axis.

The degree of rotation may be limited by stop means, which may be integrally formed with said first and/or said second member(s). As an alternative, the stop means may comprise one or more elements selected from the following group, headed studs, nut and bolt arrangements, dead stops built into the hinge, external portions of the mobile load carrier (coming into abutment with the first member) or attachments to the second member(s) situated in such a way as to limit relative movement of the first member.

Preferably the maximum deflection of the swivel axis, with the castors in their standard trailing position, is between 0 and 12 degrees from the Z axis, more preferably between 3 and 9 degrees from the Z axis, and most preferably 6 degrees from the Z axis. However, these maximum deflections would be determined on a case by case basis dependent of factors such as loading, floor/ground surface quality, desired manoeuvrability etc. For instance, a supermarket trolley would require a different level of steering assistance than a fully laden roll cage.

Preferably when the castors are in their standard trailing position and the load bearer is unladen the swivel axes are substantially aligned to the Z axis.

Optionally the swivel axes may be slightly deflected away from the Z axis, in their standard trailing position, when the load bearer is unladen.

When the castors are swivelled to a position whereby there is no positive forward tilting turning moment about the Y axis, the swivel axes are preferably substantially aligned to the Z axis. Alternatively, the swivel axes may be inclined slightly away from the Z axis in a direction opposite to that achieved in their standard trailing position.

Preferably the maximum reverse inclination is between 0 and 10 degrees from the Z axis, more preferably between 0 and 5 degrees from the Z axis, and most preferably 0 degrees from the Z axis.

According to a second aspect of the present invention there is provided a castor mounting arrangement for attachment to a mobile load carrier, the arrangement comprising a first member on which two or more castors are rotationally mounted, each castor being rotatable about a substantially upright swivel axis, and a second member for attachment to the mobile load carrier, characterised in that the second member is rotationally connected to the first member such that rotation of the first member relative to the second member is only permitted about a substantially horizontal rotational axis which is transverse to a primary direction of travel of the mobile load carrier, the rotation of the first member relative to the second member effecting synchronous tilting of the swivel axes of the castors.

The invention will be more easily understood with reference to the following embodiment and appended figures.

Figures 3, 4:
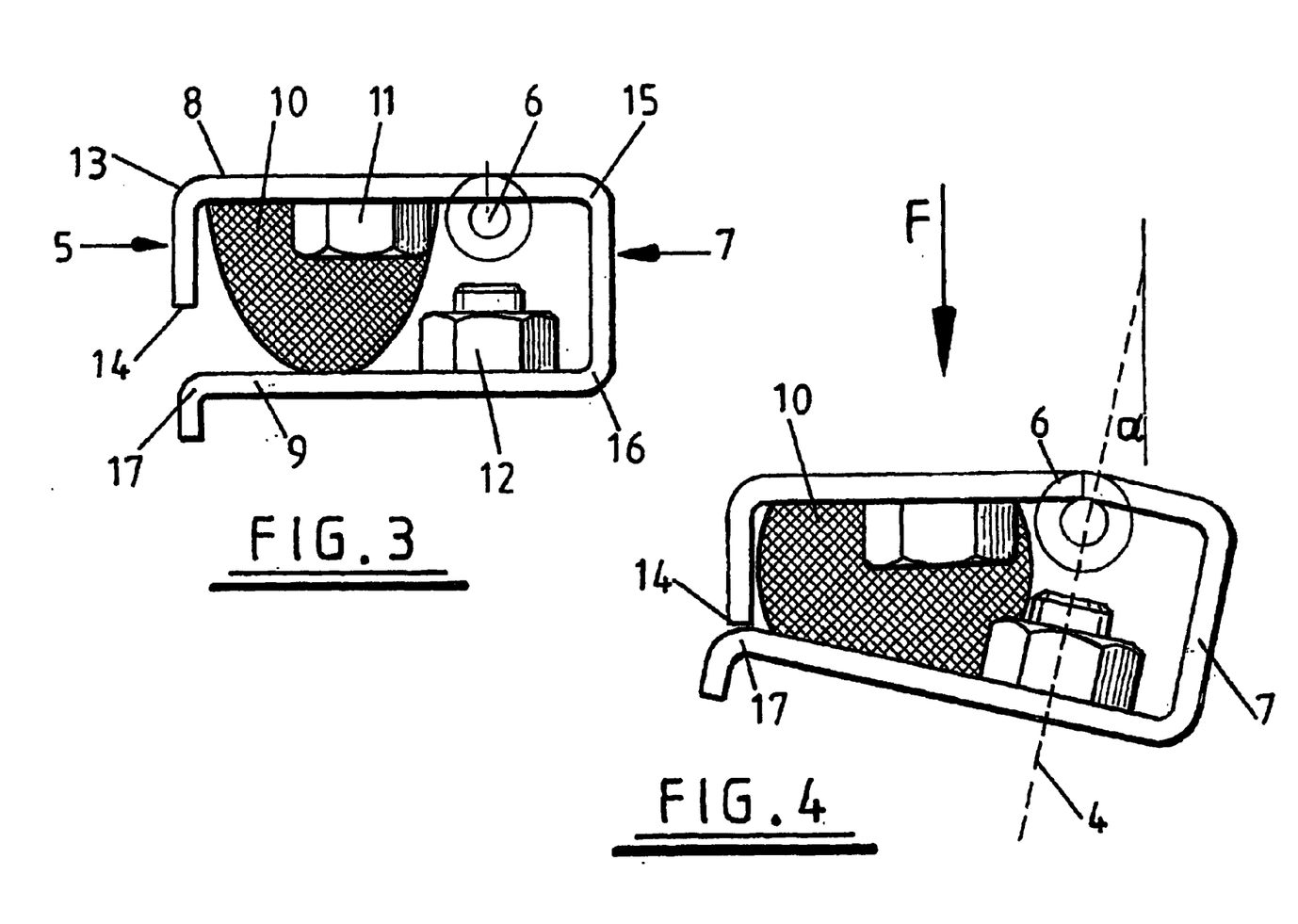
FIG. 3: Shows a side detail of an unladen mounting bracket according to one embodiment of the present invention.
FIG. 4: Shows a side detail of a laden mounting bracket according to one embodiment of the present invention.

According to a first embodiment of the present invention, FIG. 3 shows an unladen mounting arrangement comprising a first member 5, pivotally attached, via binge 6 to a second member 7, said first and second members 5, 7 having substantially parallel, planar portions 8,9 held in separation by two resilient rubber members 10. The mounting arrangement has attachment means 11, 12 for attachment to the chassis and castors respectively, attachment means 12 corresponding to the swivel axis (4, FIG. 1). The first member 5 has a 90 degree bend 13 distal the hinge 6 to provide additional torsional rigidity and also providing an abutment surface 14. The second member 7 has several 90 degree bends 15, 16, 17 again providing additional torsional rigidity and also allowing for the castor attachment means 12 to be positioned directly below the hinge 6. The outer surface of the final bend 17 in the second member 7 also acts as an abutment surface.

FIG. 4 shows the same mounting arrangement with a downward force F applied (i.e. a laden trolley) causing the mounting arrangement to pivot about the hinge 6, thus compressing the resilient rubber member 10, allowing a rotation about the Y axis, thereby causing the castor swivel axis 4 to deflect away from the Z axis by a predetermined angle $\alpha$, said angle $\alpha$ being limited by the abutment surface 14 coming into contact with the outside of bent portion 17 of the second member 7.

Figure 5:
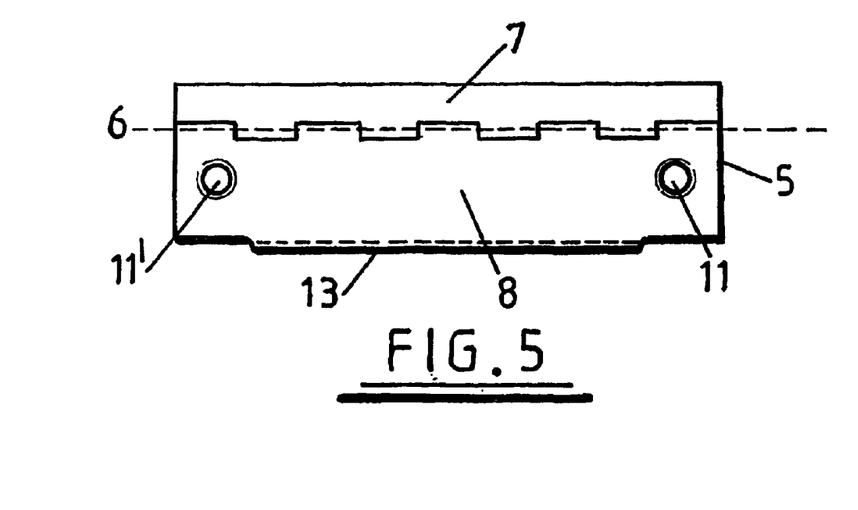
FIG. 5: Shows a top detail of a mounting bracket according to one embodiment of the present invention.
Figure 6:
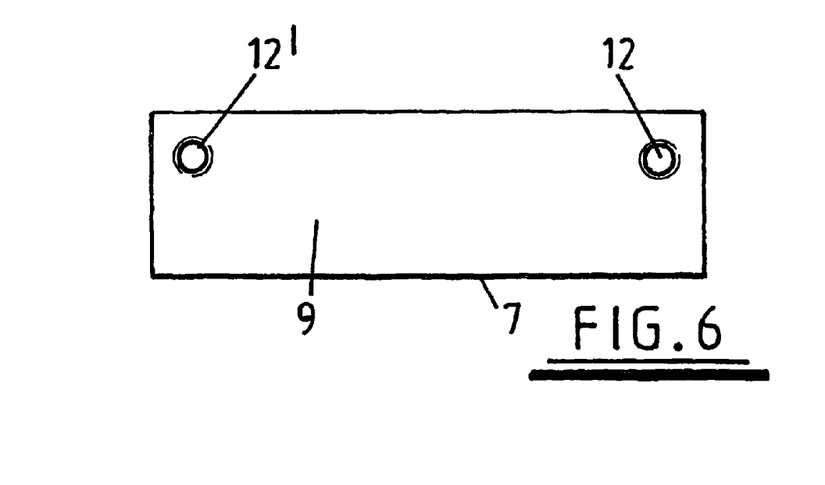
FIG. 6: Shows a bottom detail of a mounting bracket according to one embodiment of the present invention.

FIGS. 5 and 6 show top and bottom views, respectively, of a mounting member of the present invention, designed to mount a pair of castors. FIG. 4 shows the planar portion 8 and the bend 13 of the first member 5, the line of the hinge 6, the top portion of the second member 7 and first and second chassis attachment means 11, 11'. FIG. 5 merely shows the planar portion 9 of the second member 7, with first and second castor attachment means 12, 12'.

Figure 7:
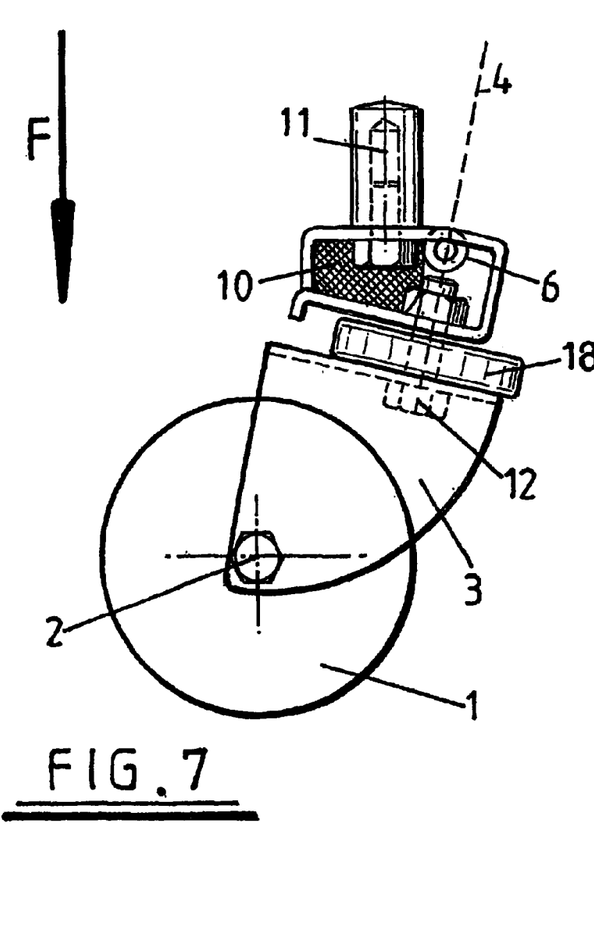
FIG. 7: Shows a castor, under load in the standard trailing position attached to a mounting arrangement according to one embodiment of the present invention.

Referring now to FIG. 7, the mounting arrangement is identical to that shown in FIG. 3, but the castor is also shown, in its standard trailing position, with wheel 1, axle 2, wheel mount 3, castor bearing 18, the whole of castor attachment means 12 and chassis attachment means 11. As can be seen, the application of a downward force F (from loading the trolley), and the resulting force acting upward through the wheel axle 2, causes the entire assembly to pivot about the hinge 6, thus compressing the resilient rubber member 10 and causing the swivel axis 4 to deflect from the vertical, thus providing an aid to steering. The degree of compression of the rubber member 10 is proportional to the force F and therefore the load in the trolley, thus the degree of steering assistance increases with the weight of the trolley.

Figure 8:
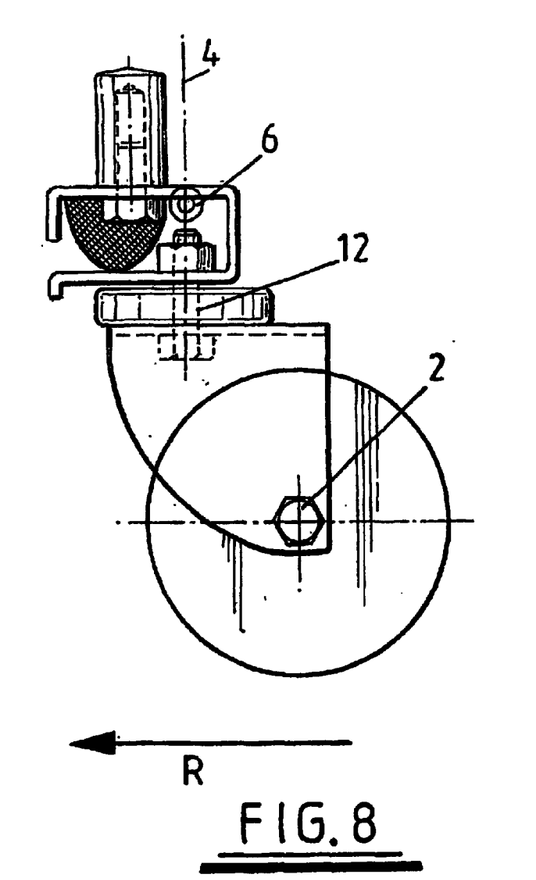
FIG. 8: Shows a castor, under load in the 180 degrees away from the standard trailing position attached to a mounting arrangement according to one embodiment of the present invention.

FIG. 8 shows the same view as FIG. 7, except the castor is 180 degrees away from its standard trailing position, as would result from the mobile load bearer being driven in a reverse direction R. As is clearly shown, the swivel axis 4 has returned to alignment with the Z axis, since the assembly is now trying to pivot about the hinge 6 in a reverse direction, the swivel axis 4 being held substantially aligned to the Z axis by the rotational stop arrangement of hinge 6. This reverse pivoting is brought about by the fact that the castor attachment means 12 is positioned such that when the castor is in its reverse trailing position, the wheel axle 2 is horizontally beyond the hinge 6 and therefore exerts a reverse moment about hinge 6.

Figure 9:
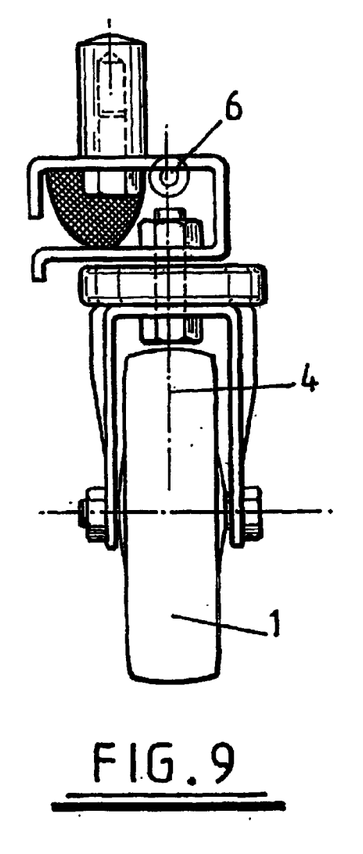
FIG. 9: Shows a castor, under load in the 90 degrees away from the standard trailing position attached to a mounting arrangement according to one embodiment of the present invention.

FIG. 9 shows the castor in a position intermediate the positions shown in FIGS. 7 and 8, i.e. 90 degrees away from its standard trailing position, as would be caused by pulling the trolley in a sideways direction along the Y axis. The swivel axis 4 is again vertical, due to its positioning directly beneath the hinge 6, resulting in there being no turning moment exerted on the hinge 6.

The arrangement described in FIGS. 7 to 9 has the overall result that when the trolley is laden and moving in a forwards direction, the castor angle (the inclination of the swivel axis forward and away from the Z axis) is load dependent until the mechanical stops are reached, yet when the vehicle is moving sideways or backwards the castor angle is substantially zero, therefore the trolley behaves in the same way as a conventional or unmodified trolley.

Figure 10:
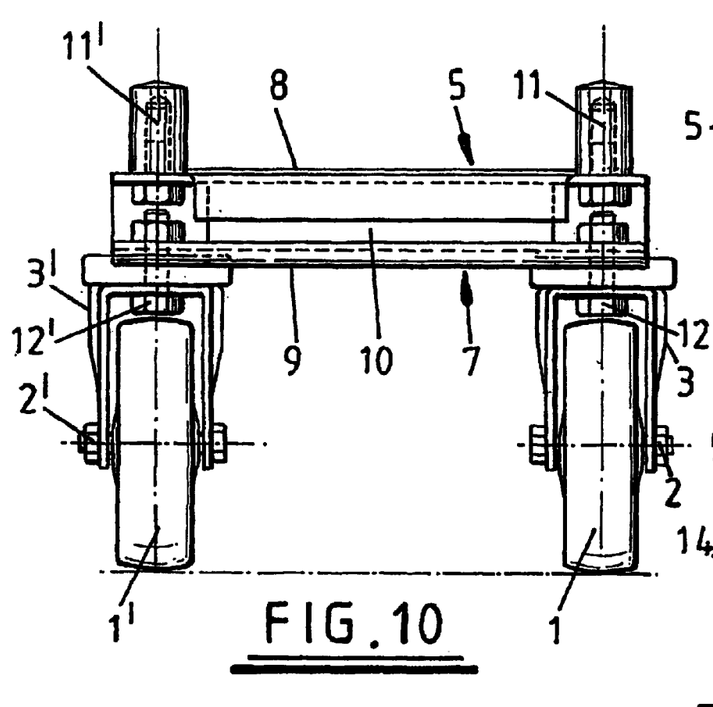
FIG. 10: Shows a front view of a pair of castors in a mounting arrangement according to one embodiment of the present invention.

FIG. 10 is a view of a twin castor mounting arrangement looking forwards, according to the present invention showing the wheels 1,1', the wheel axles 2,2', the wheel mounts 3,3', the planar portions 8,9 of the first and second members 5,7 respectively, the resilient rubber member 10, the chassis mounting means 11,11' and the castor mounting means 12, 12'. The aforementioned bends (FIGS. 2 13, 15, 16, 17) providing torsional rigidity across the length of the first and second members 5, 7.

Figure 11:
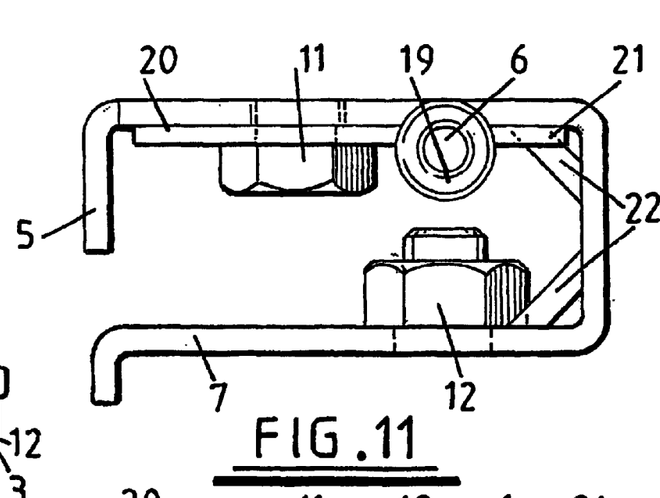
FIG. 11: Shows a side detail of an unladen mounting bracket according to a second embodiment of the present invention.

Referring now to FIG. 11, a second preferred embodiment of the current invention is shown with no applied load. The view is the same as that shown in FIG. 2 and for clarity, the same numbering system has been maintained. As is shown, the first member 5 is attached to the second member 7 via a hinge 6, with the mounting means 11, 12 remaining unaltered. The elastomeric member (FIGS. 2; 10) has been removed, with biassing now being provided by torsion springs 19 (only one shown), with two legs 20, 21 providing a biassing force against the first and second members 5, 7 respectively. The coil of the spring 19 is wrapped around the hinge pin 6. The only other change from the first embodiment is the addition of stiffening ribs 22 dissecting some of the bends (FIGS. 2; 15, 16) in the second member 7, interspaced across the length of the bracket, this reduces drastically the propensity for the second member 7 to either bend further or unbend whilst under load.

Figure 12:
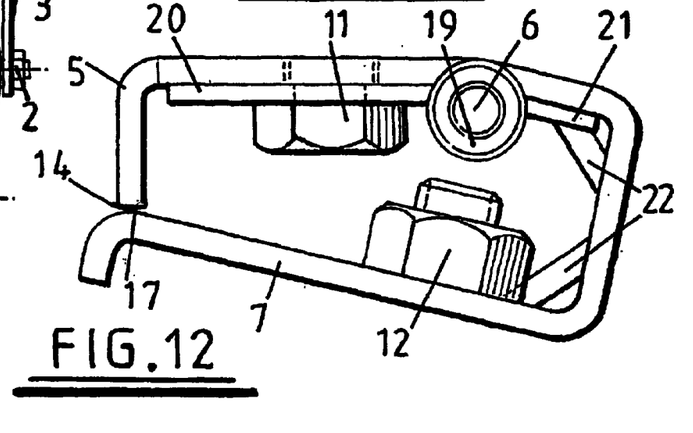
FIG. 12: Shows a side detail of a laden mounting bracket according to a second embodiment of the present invention.

FIG. 12 shows the same embodiment under an applied load (representing a fully laden trolley). The same numbering is used as in FIG. 10, with the addition of the abutment surfaces 14, 17 of the first and second members 5, 7 respectively. The use of a coiled torsion spring provides a uniform relationship between applied load and deflection of the spring, whilst keeping the space between the first and second members 5, 7 relatively uncluttered, thereby allowing easier access to the attachment means 11, 12.

Figure 13:
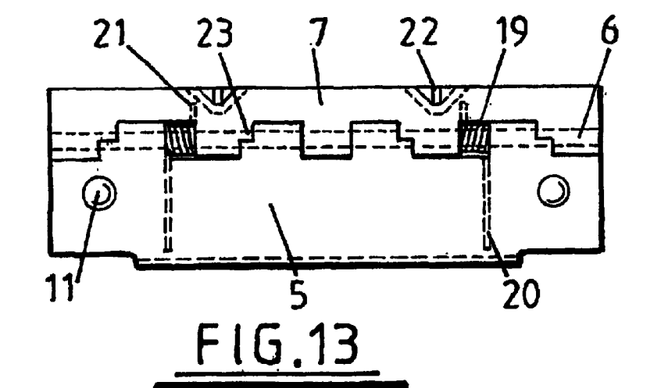
FIG. 13: Shows a top detail of a mounting bracket according to a second embodiment of the present invention.

FIG. 13 shows a top view of the second embodiment, clearly showing the first and second members 5, 7, the hinge 6, the two torsion springs 19 and their legs 20, 21, the ribbing 22 along the bent portion and also the dead stops 23 on the hinge members.

Figure 14:
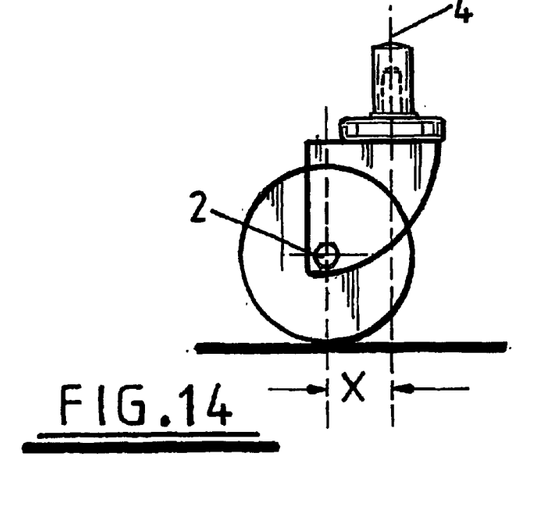
FIG. 14: Shows the displacement of the wheel axle from the swivel axis in a standard castor.
Figure 15:
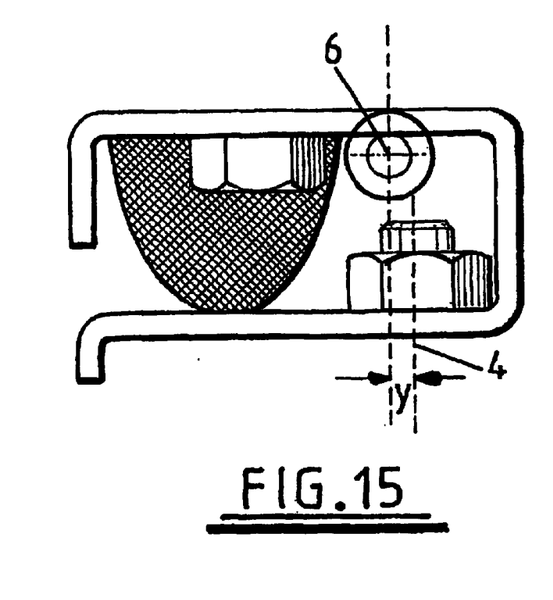
FIG. 15: Shows a side detail of a mounting bracket according to a third embodiment of the present invention.

A third embodiment differs from the first embodiment only in that the castor mounting means are offset along the X axis with respect to the hinge. The effect of this offsetting is to adjust the rotational angle of the castor which is required to return the swivel axis to a vertical orientation. Referring to FIGS. 14 and 15, a castor has its axle 2 displaced a distance x from its swivel axis 4. If the castor mounting means, and therefore the swivel axis 4 are displaced a distance y along the X axis forwards of the hinge 6, then the castor must be swivelled to an angle Θ from its normal trailing position before the swivel axis is vertical, since at this point the wheel axle 2, and therefore the contact between the wheel and the ground, is directly beneath the pivot point of the hinge 6. If the desired angle Θ is known, and the distance x is also known then the distance y can be calculated from the following formula:

$$y = x \cos \Theta,$$

conversely if the distances x and y are both known, the angle Θ, at which the swivel axis will achieve a substantially vertical orientation, can be calculated from the rearranged formula:

$$\Theta = \cos^{-1}(y/x)$$

Thus, for a given castor offset, it is a very simple process to fine tune the performance or steerability of the castors mounted according to the present invention to fit the requirements of a particular mobile load bearing body.

The dead stop in this embodiment is provided by a nut and bolt arrangement passing through both first and second members, thereby limiting the amount by which the hinge can open. This provides the added advantage that the first member of the assembly can be attached to the chassis of a trolley, the second member can be attached to the castors and then the two members can be interconnected by the hinge pin, with the limiting nut and bolt assembly being attached last, thus securing the whole arrangement. This allows more freedom for the attachment of both the castors to the second member and the first member to the chassis, thus improving the efficiency and speed with which the mounting assembly can be fitted.

A final embodiment differs from the first embodiment only by the omission of the resilient rubber members. This has the effect that the castor swivel axes deflect fully when they are within 90 degrees of their standard trailing position, otherwise they return to the vertical. Effectively we are left with a load independent, directionally dependent inclination of the swivel axes.

It should be recognised that the foregoing embodiments are given by way of example only and are in no way intended to limit the scope of the invention, which is defined in the appended claims.

What is claimed is:

1. A mobile load carrier comprising a load carrying portion and a castor mounting arrangement, the arrangement comprising a first member on which two or more castors are rotationally mounted, each castor being rotatable about a substantially upright swivel axis, and a second member fixed to, or forming part of, the load carrying portion, the second member being rotationally connected to the first member, characterised in that significant movement of the first member relative to the second member is restricted to rotation about a substantially horizontal axis of rotation which is transverse to a primary direction of travel of the mobile load carrier, the rotation effecting synchronous tilting of the swivel axes of the castors.

2. A mobile load carrier according to claim 1, wherein the amount of rotation of the first member relative to the second member is dependent on the load applied to the carrier.

3. A mobile load carrier according to claim 2, wherein said load dependency is provided by one or more biasing members acting between said first and second members.

4. A mobile load carrier according to claim 3, wherein said one or more biasing members comprise one or more elastomeric elements disposed between said first and said second members.

5. A mobile load carrier according to claim 3, wherein said one or more biasing members comprise one or more spring elements.

6. A mobile load carrier according to claim 2, wherein the castor swivel axes are offset from the axis of rotation of the first and second members and rotation of the first member relative to the second member occurs only when each castor is less than 90 degrees from a standard trailing position.

7. A mobile load carrier according to claim 1, wherein the castor swivel axes intersect the axis of rotation of the first and second members, and rotation of the first member relative to the second member occurs only when each castor is between 0 and 90 degrees of a standard trailing position.

8. A mobile load carrier according to claim 1, wherein the castor swivel axes are offset from the axis of rotation of the first and second members and rotation of the first member relative to the second member occurs only when each castor is less than 90 degrees from a standard trailing position.

9. A mobile load carrier according to claim 1, wherein rotation of the first member relative to the second member is limited by stop means.

10. A mobile load carrier according to claim 9, wherein said stop means is integrally formed on said first and/or said second member.

11. A mobile load carrier according to claim 1, wherein said first and second members respectively form the lower and upper leaves of a hinge, the hinge pin of which forms the axis of rotation.

12. A castor mounting arrangement for attachment to a mobile load carrier, the arrangement comprising a first member on which two or more castors are rotationally mounted, each castor being rotatable about a substantially upright swivel axis, and a second member for fixed attachment to the mobile load carrier, the second member is rotationally connected to the first member characterised in that significant movement of the first member relative to the second member restricted to rotation about a substantially horizontal rotational axis which is transverse to a primary direction of travel of the mobile load carrier, the rotation of the first member relative to the second member effecting synchronous tilting of the swivel axes of the castors.

13. A mobile load carrier intended to have a primary direction of travel, the carrier comprising a load carrying portion and a castor mounting assembly, the assembly comprising:
 a castor supporting member;
 an attachment member fixed to or forming part of a chassis of the mobile load carrier;
 a plurality of castors rotationally mounted on the castor supporting member, each castor being rotatable about a substantially upright swivel axis;
wherein significant movement of the castor supporting member relative to the attachment member is restricted to rotation about a substantially horizontal axis of rotation, said axis of rotation being transverse to the primary direction of travel, the rotation effecting synchronous tilting of the swivel axes of the castors.

* * * * *